United States Patent [19]

Aguado

[11] Patent Number: 5,570,097
[45] Date of Patent: Oct. 29, 1996

[54] RETRANSMITTED GPS INTERFEROMETRIC SYSTEM

[75] Inventor: Morton M. Aguado, New York, N.Y.

[73] Assignee: Northrop Grumman Corporation, Los Angeles, Calif.

[21] Appl. No.: 513,712

[22] Filed: Aug. 11, 1995

[51] Int. Cl.$^6$ ............................. H04B 7/185; G01S 5/02
[52] U.S. Cl. .......................... 342/357; 342/408; 342/424; 342/156
[58] Field of Search ..................................... 342/357, 424, 342/408, 156

[56] References Cited

U.S. PATENT DOCUMENTS

| | | | |
|---|---|---|---|
| 5,359,521 | 10/1994 | Kyrtsos et al. | 364/449 |
| 5,384,574 | 1/1995 | Counselman, III | 342/357 |
| 5,438,337 | 8/1995 | Aguado | 342/357 |
| 5,446,465 | 8/1995 | Diefes et al. | 342/357 |

*Primary Examiner*—Theodore M. Blum
*Attorney, Agent, or Firm*—Terry J. Anderson; Karl J. Hoch, Jr.

[57] ABSTRACT

A retransmitted Ground Positioning System (GPS) using retransmission of a GPS signal in combination with an interferometer for determining the angular deviations of an aircraft relative to a landing site in both vertical and horizontal planes, by using the accumulated phase of the GPS carrier signal. The system includes an aircraft and a landing site, wherein a first unit comprising one of the aircraft and the landing site includes a GPS retransmitter for retransmitting GPS signals to a second unit comprising the other of the aircraft and the landing site, which includes a GPS receiver/computer two spaced apart GPS antennas mounted on a rotating frame, the plane of rotation of which is normal to the landing strip. In a first general configuration, each GPS antenna in the interferometer comprises a GPS receiving antenna and a GPS transmitting antenna, and an amplifier connecting the GPS receiving antenna with the GPS transmitting antenna, and the aircraft includes a GPS receiver/computer. In a second general configuration, the landing site comprises an aircraft carrier, wherein the aircraft carrier includes two receive only GPS antennas, which are rotated in a plane perpendicular to the carrier deck, and a GPS receiver/computer. A single GPS retransmitting unit is mounted on the aircraft and comprises a GPS receiving antenna, a GPS transmitting antenna, and an amplifier connecting the GPS receiving antenna with the GPS transmitting antenna.

13 Claims, 6 Drawing Sheets

FIG.1 RE-TRANSMITTED GPS

FIG.2 RE-TRANSMITTED GPS FOR CARRIER LANDING

FIG.3 RE-TRANSMITTED GPS GEOMETRY

FIG. 4 RTGPSI CONCEPT (4 PT ROTATION)

FIG.5 CARRIER INTERFEROMETER, VERTICAL POSITION

FIG.6 INTERFEROMETER, VERTICAL POSITION

FIG. 7 RTGPSI HORIZONTAL INTERFEROMETER

FIG. 8 CARRIER INTERFEROMETER, HOR POSITION

FIG.9 SATELLITE TO INTERFEROMETER GEOMETRY

5,570,097

RETRANSMITTED GPS INTERFEROMETRIC SYSTEM

BACKGROUND OF THE INVENTION

The present invention is an improvement over the NAVIGATION SYSTEM USING RE-TRANSMITTED GPS disclosed in the U.S. patent application Ser. No. 08/127,039, filed Sep. 24, 1993, the entire disclosure of which is expressly incorporated by reference in the present patent application.

1. Field of the Invention

The present invention relates generally to a retransmitted Global Positioning System (GPS) interferometric system, and more particularly pertains to a retransmitted GPS interferometric system using retransmission of GPS signal in combination with an interferometer for determining the angular deviations of an aircraft relative to a landing site in both vertical and horizontal planes, by using the accumulated phase of the GPS carrier signal.

2. Discussion of the Prior Art

Both the FAA and the Navy are actively pursuing a navigational capability for approach and landing of aircraft of all types including fixed wing, STOL, VSTOL and helicopter aircraft. Several key objectives include a navigational capability for precision landing and ultimately to provide for a fully automatic hands-off landing (autoland), which is generally accomplished by an aircraft based navigation system and autopilot. A flare maneuver, touchdown and rollout completes the landing for the land based case. Navigation is required by the aircraft in all of the landing phases. For a naval carrier landing, it is the carrier which determines the position of the aircraft (relative to the carrier deck), and determines the commands for the aircraft autopilot.

Precision landing has been divided into three categories, each requiring progressively greater accuracy as the type of landing selected ranges from manual to automatic. The decision heights and navigational accuracy requirements for each category is given in Table 1.

TABLE 1

Precision Approach/Landing Requirements

| Category | ht. abv surface (ft) | accuracy req. lateral (ft-2σ) | vertical (ft-2σ) |
|---|---|---|---|
| I | 200 | +56.1 | +13.6 |
| II | 100 | +16.9 | +5.7 |
| III | 50* | +13.2* | +1.8* |

*runway threshold values

Whereas fixed wing aircraft generally use a low angle landing approach (usually 3 deg), the other types require a high angle approach, and therefore the landing navigation system must be flexible enough to provide for all types of approaches and landings. Further, the navigational capability must be provided in all phases of the landing so that the aircraft can know its position with respect to both the runway approach threshold and the runway end (for rollout, waveoff or runway exit).

SUMMARY OF THE INVENTION

Accordingly, it is a primary object of the present invention to provide a retransmitted GPS interferometric system using retransmission of a GPS signal in combination with an interferometer for determining the angular deviations of an aircraft relative to a landing site in both vertical and horizontal planes, by using the accumulated phase of the GPS carrier signal.

The present invention uses retransmission of a GPS signal, in conjunction with the principles of interferometry to develop a new approach (RTGPSI) for determining the angular deviations of the aircraft relative to the normal to the interferometer baseline, in both the vertical and horizontal planes, in which the measurements are the very accurate accumulated phase of GPS carrier.

The present invention employs two navigation systems deriving data from the GPS satellites in different ways. One navigation system derives relative position and velocity from data received directly from the satellites and also from the same satellites via retransmission (RTGPS). The second navigation system derives the angular deviations of the aircraft from the landing strip reference based upon the data from one satellite retransmitted through an interferometer (RTGPSI). The accuracy of the first navigation system is GDOP dependent, while the accuracy of the second navigation system is not.

The present invention provides a simple mechanization of two standard, receive only GPS antennas, which are rotated in a plane perpendicular to the landing strip or carrier deck, and requires only a single retransmitting unit on the aircraft consisting of an amplifier connecting a receive and retransmitting GPS antenna. The system uses very accurate GPS carrier phase measurements to derive interferometer horizontal and vertical deviation angles. The interferometer consists of two retransmitting units, essentially one mounted on either end of a rotating frame. A retransmitting unit can consist of a hemispherical GPS receive and a transmit antenna connected by a heterodyne amplifier.

A further object of the subject invention is the provision of a totally GPS (Global Positioning System) based system to meet all landing requirements without the need for a supplemental data link, as is the case for Differential GPS (or the need for any other augmenting device such as pseudo-lites), and also offers the potential for greater flexibility and accuracy at lower cost. In addition, the approach also:

provides accuracy for CAT III landing requirements under all weather conditions, and GDOP variations;

satisfies all reliability and integrity issues associated with GPS assisted landing;

limits the transmission of erroneous data to one second or less; and can provide aircraft navigational data to the tower during taxi to or from runway, or during marshalling without the need for a data link or voice communications.

In accordance with the teachings herein, the present invention provides a retransmitted Ground Positioning System (GPS) using retransmission of a GPS signal in combination with an interferometer for determining the angular deviations of an aircraft relative to a landing site in both vertical and horizontal planes, by using the accumulated phase of the GPS carrier signal. The system includes an aircraft and a landing site, wherein a first unit comprising one of the aircraft and the landing site includes a GPS retransmitter for retransmitting GPS signals to a second unit comprising the other of the aircraft and the landing site, which includes a GPS receiver/computer. The landing site includes an interferometer comprising two spaced apart GPS antennas mounted on a rotating frame, the plane of rotation of which is normal to the landing strip.

In a first general configuration, each GPS antenna in the interferometer comprises a GPS receiving antenna and a GPS transmitting antenna, and an amplifier connecting the GPS receiving antenna with the GPS transmitting antenna, and the aircraft includes a GPS receiving antenna and GPS receiver/computer. The GPS receiver/computer includes two additional channels, each of which continuously tracks a single satellite GPS signal through one of the GPS antennas of the interferometer.

In a second general configuration, the landing site comprises an aircraft carrier, wherein the aircraft carrier includes two receive only GPS antennas, which are rotated in a plane perpendicular to the carrier deck, and a GPS receiver/computer. A single GPS retransmitting unit is mounted on the aircraft and comprises a GPS receiving antenna, a GPS transmitting antenna, and an amplifier connecting the GPS receiving antenna with the GPS transmitting antenna. The GPS receiver/computer includes two additional channels, each of which continuously tracks single satellite GPS signal through one of the GPS antennas of the interferometer.

In greater detail, the phase measurements are taken from each of the two GPS antennas of the interferometer to determine the vertical deviation angle, when the two GPS antennas are in a first vertical position and a second reversed vertical position and from each of the two GPS antennas for determining the horizontal angle when the two GPS antennas are in a first horizontal position and a second reversed horizontal position. In retransmitting the GPS data, a positional mark is added to the retransmitted GPS signal to enable the aircraft to determine the angular position of the interferometer. Indexing of the antennas to the four positions is accomplished by a pickup which detects the angular position of the rotating interferometer.

The retransmitted data received at the second unit from the first unit is processed by a GPS receiver/computer in the second unit, and the second unit determines a pseudo-range and a pseudo-range rate measurement, from which it computes the first unit's position and velocity based upon the retransmitted GPS data and its own position and velocity based upon GPS data it receives directly.

When the landing site comprises a landing field, the interferometer position site parameters in the landing field are conveyed to the aircraft by including the data in the GPS navigational message transmitted to the aircraft. The GPS receiver/computer provides a code based pseudo-range measurement, and also generates accumulated carrier phase measurements by taking the difference between the phase of the GPS carrier signal of the satellite measured at the receiver, relative to the phase of the same carrier frequency generated by a clock within the receiver/computer to provide an accumulated phase measurement. The GPS receiver/compute derives relative position and velocity from data received directly from the satellites and also from the same satellites via retransmission. In one disclosed embodiment, each of the retransmitted GPS signals is shifted to a different carrier frequency, and an accumulated phase measurement is generated for each frequency shifted signal, relative to a frequency signal generated within the receiver by a clock.

BRIEF DESCRIPTION OF THE DRAWINGS

The foregoing objects and advantages of the present invention for a retransmitted GPS interferometric system may be more readily understood by one skilled in the art with reference being had to the following detailed description of several preferred embodiments thereof, taken in conjunction with the accompanying drawings wherein like elements are designated by identical reference numerals throughout the several views, and in which.

DETAILED DESCRIPTION OF THE DRAWINGS

The RTGPS/RTGPSI System

The RTGPS/RTGPSI system is comprised of an integration of two GPS based systems, a retransmitted GPS (RTGPS) system, as disclosed in patent application Ser. No. 127,039, filed Sep. 24, 1993, and a retransmitted GPS interferometer system (RTGPSI) pursuant to the present invention.

FIG. 4 of patent application Ser. No. 127,039 discloses an embodiment wherein more accurate vertical data is derived from the GPS signals by using an interferometer. The disclosed interferometer is a classic type of interferometer which measures the GPS carrier phase difference of arrival between two antennas. Ambiguities are solved in a classic manner, possibly with a third antenna. The intent is to enhance the vertical accuracy.

In contrast thereto, the RTGPSI concept of the present invention provides a novel interferometer in which two antennas of the interferometer independently track and provide the accumulated phase of the GPS carrier signal. The interferometer employs an antenna swap technique (rotation of 180 degrees) to resolve initial accumulated phase ambiguities.

The RTGPS/RTGPSI system is an integration of two distinct navigation system approaches to utilizing GPS, which have a common basis. Both are based on the retransmission of the GPS signal by a primary unit, essentially as received, to one or more secondary units so as to allow the secondary unit(s) to compute a set of absolute/relative navigational parameters. A brief description of each system is followed by a description of the unified system.

A. RTGPS

Retransmitted GPS is an approach which can fulfill the navigation accuracy requirements for precision approach and landing at civilian airports or for automatic carrier landing. This can be accomplished utilizing the GPS elements which are already in place without the need for additional data or communication links between the airport and aircraft, surveyed sites, pseudo-lites and other supplemental requirements, and at very low cost.

Basically, the landing problem using GPS is recast from using GPS as an absolute reference to its use as a relative reference. The landing problem becomes a relative one where the GPS position and velocity of one unit (located at the aircraft or landing point) is computed relative to the other unit (correspondingly located at the landing point or aircraft) maximizing the use of common equipment and data on a measurement to measurement basis, and hence utilizing the full relative navigation potential for error reduction.

Figure 1:
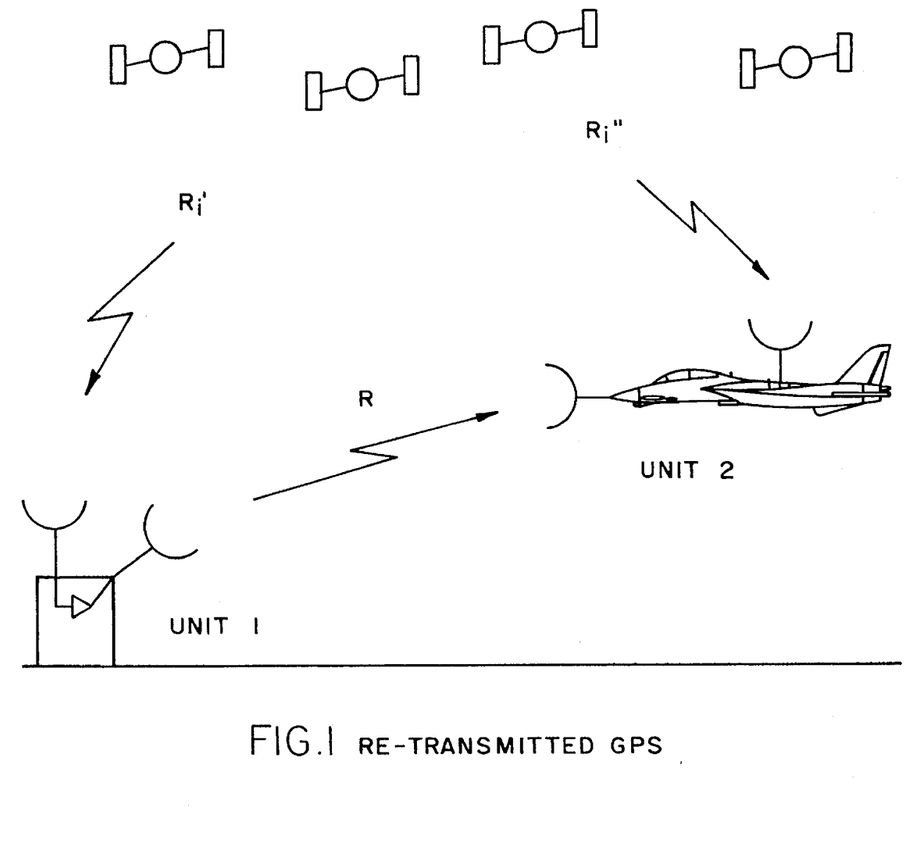
FIG. 1 illustrates a system wherein GPS data is retransmitted from landing point to aircraft, offering the flexibility for the aircraft to compute its position relative to the landing point.
Figure 2:
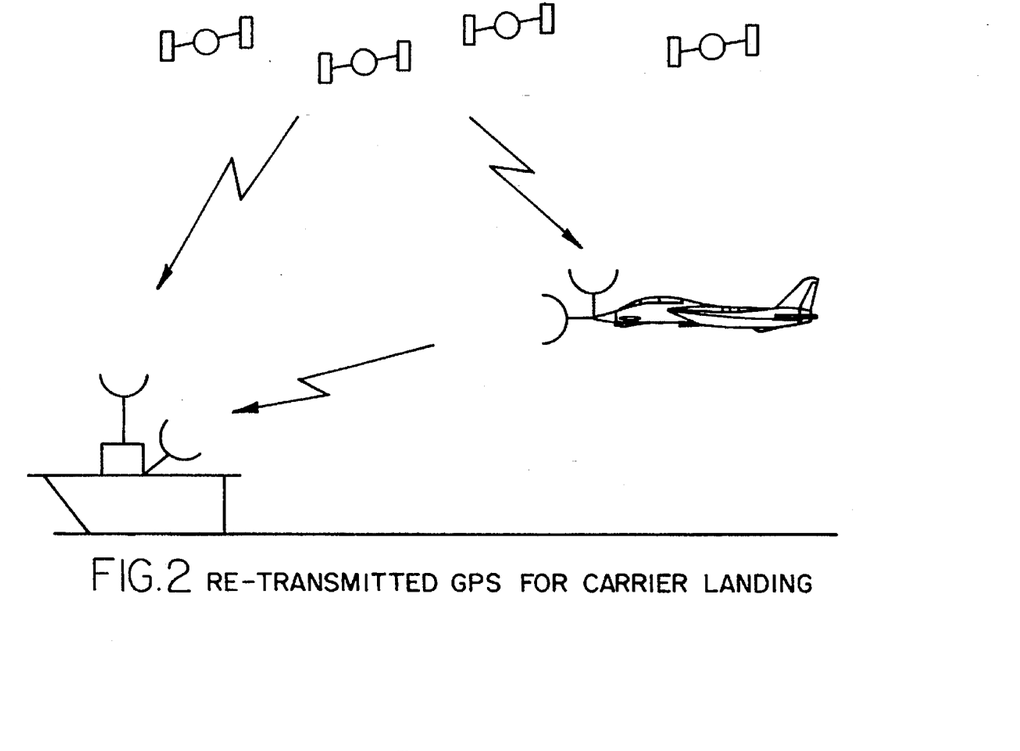
FIG. 2 illustrates a reverse system wherein GPS data is retransmitted from aircraft to a landing point such as a naval carrier which computes the aircraft position relative to the carrier deck.

The potential for the approach can be seen by realizing that retransmitting GPS data can be from landing point to aircraft or the reverse, from aircraft to landing point. FIG. 1 illustrates a system wherein GPS data is retransmitted from landing point to aircraft, offering the flexibility for the aircraft to compute its position relative to the landing point. FIG. 2 illustrates a reverse system wherein GPS data is retransmitted from aircraft to a landing point such as a naval carrier which computes the aircraft position relative to the carrier decks. This offers the flexibility for the aircraft to compute its position relative to the landing point, or the reverse for a naval carrier to compute the aircraft position relative to the deck, as illustrated in FIGS. 1 and 2. Other uses are applicable for the reverse as well, such as a tower continuously monitoring the position of a taxiing or marshaling aircraft, all without the need for an additional data link. Note also, that for either case, there is no need to communicate any data between the two units beyond the retransmitted GPS signal.

The basic idea in the retransmitted GPS approach is to retransmit the GPS data received at the antenna of one unit directly, as received, to the second unit where the first and second unit's relative position and velocity are computed using data derived from the same satellites. The retransmitting unit acts only as GPS signal pass-through.

Figure 3:
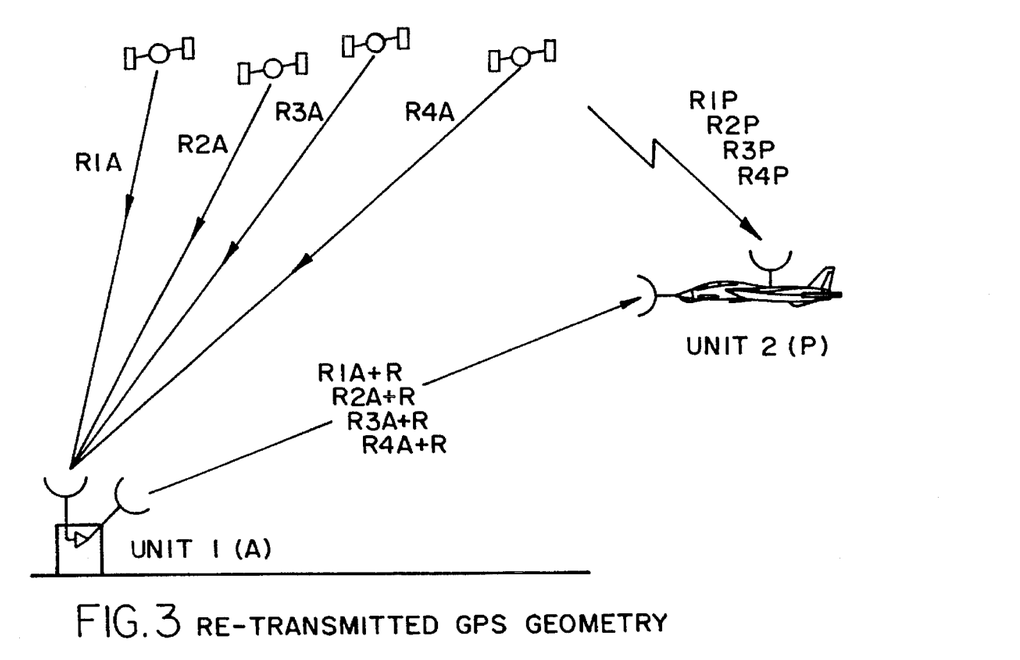
FIG. 3 illustrates an arrangement wherein the GPS data received from multiple satellites at a first unit antenna is put through an amplifier and retransmitted by another GPS antenna to the second unit.

FIG. 3 illustrates an arrangement wherein the GPS data received by the unit 1 antenna is directed through an amplifier and retransmitted by another GPS antenna to the second unit. Note that the data received by the unit 1 antenna is not put through a GPS receiver or processed at unit 1. No measurement is made at unit 1. Of course, if unit 1 wanted to know its own GPS absolute position, it could make its own pseudo-range measurements through a signal splitter at the GPS antenna which directs the signal to its own GPS receiver/computer, but does not process or interfere with the GPS pass through data being retransmitted.

The retransmitted data received at unit 2 from unit 1 is processed by unit 2's GPS receiver/computer. Unit 2 effects a pseudo-range and a pseudo-range rate measurement (and possibly a GPS carrier accumulated phase measurement), from which it computes unit 1's position and velocity based on the retransmitted GPS data and its own position and velocity based on GPS data it receives directly. The relative position and velocity is then formulated or can be computed directly from the measurements made from the direct and retransmitted GPS signals.

Since unit 2 has both sets of data, it can choose to use the same satellites to compute both sets of positions, which results in substantial error reduction. There is no need for a surveyed site since unit 1's GPS antenna position is computed relative to unit 2's GPS antenna position, and the relative error reduction is achieved on a sample to sample basis.

The retransmitted GPS data that unit 2 receives from unit 1 includes the full GPS signal. From this GPS signal, unit 2 makes a pseudo-range and pseudo-range rate measurement for unit 1 which is of the form, $$R_i^r = R_i' + TB + R \qquad (1)$$

$$\dot{R}_i^r = \dot{R}_i' + \dot{TB} + \dot{R} \qquad (2)$$

where:
$R_i^r$=unit 1's pseudo-ranges as measured at unit 2;
$R_i$=direct range to unit 1;
R=range between unit 1 and unit 2;
TB=GPS time bias in units of range
.=rate with respect to time.

In general, i=1 to 4 (or more), indicating a measurement to at least 4, but possibly more, satellites. The direct measurements made by unit 2, using the same receiver or at least a common clock, are given by, $$R_i^d = R_i'' + TB \qquad (3)$$

$$\dot{R}_i^d = \dot{R}_i'' + \dot{TB} \qquad (4)$$

Using the unit 2 pseudo-range and range rate measurements given by equations 1–4, the absolute and relative GPS position of the two units can be derived at unit 2 as follows.

Taking the difference between the retransmitted and directly measured pseudo-ranges to the same satellites made by unit 2 yields $$R_i^r = R_i^d = R_i' - R_i'' + R \qquad (5)$$

which eliminates the time bias which is common to both sets of measurements since they are made by the same receiver or referenced to the same clock. Also, since during landing the two units are in close proximity, any GPS biases and errors down to relatively short correlation times are eliminated.

Realizing that simultaneous measurements to at least four satellites have been made by the unit 2 receiver, taking a second difference obtains, $$(R^r - R^d)_i - (R^r - R^d)_{i+1} = (R' - R'')_i - (R' - R'')_{i+1}, \qquad (6)$$

eliminating the common range between the two units which has been added to each of the retransmitted satellite range measurements made by the unit 2 receiver. Since R includes errors such as retransmission multipath between the two units, cable lengths between the GPS receiving antenna and the retransmitting antenna in unit 1 and the similar cable lengths at unit 2, retransmission delays, and any other errors associated with the retransmission, all of these errors cancel as well. What remains is a highly error free pseudo-range double difference which is equal to the true range double difference from which the relative position between the two units can be determined.

In a similar approach, the relative velocity between the two units can be determined, which in the landing situation where unit 2 is fixed at the landing site, is just the velocity of unit 1.

For more accuracy, a GPS accumulated carrier phase measurement can be utilized in conjunction with the pseudo-range measurement.

B. RTGPSI

The system of the present invention uses the basic premise of the above, retransmission of the GPS signal, in conjunction with the principles of interferometry to develop a new approach (RTGPSI) for determining the angular deviations of the aircraft relative to the normal to the interferometer baseline, in both the vertical and horizontal planes. The basic measurements are the very accurate accumulated phase of the GPS carrier.

Figure 4:
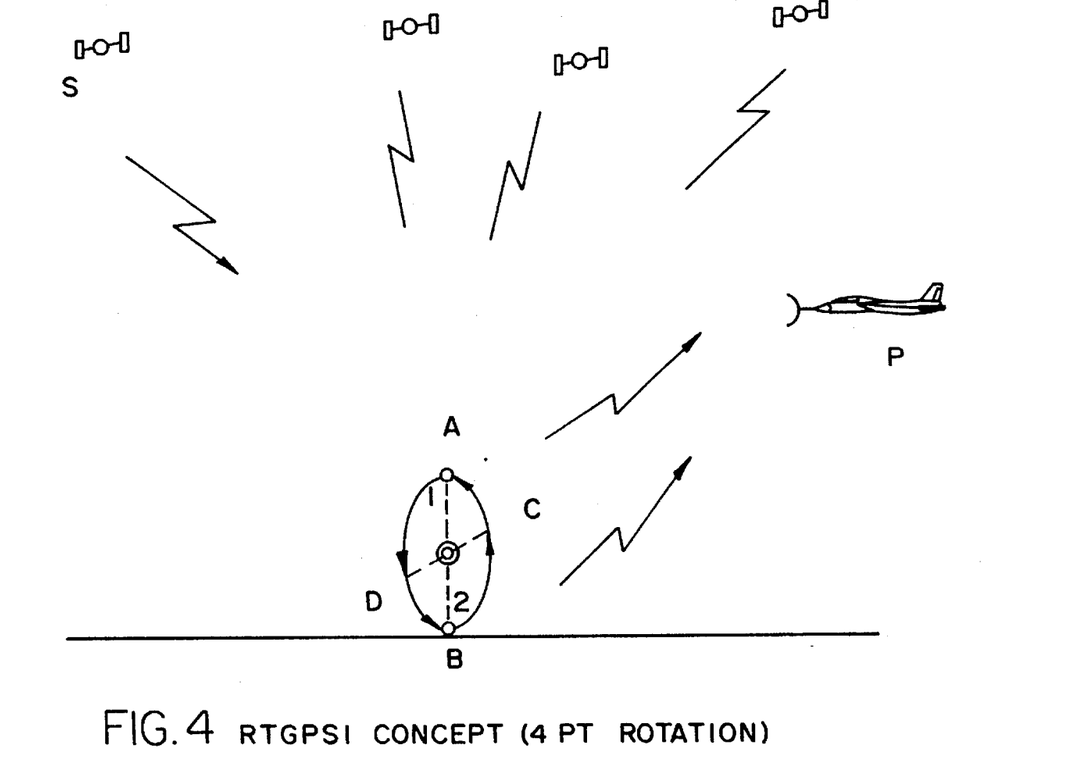
FIG. 4 illustrates a first embodiment pursuant to the present invention wherein an interferometer comprises two retransmitting units located at the landing site mounted on a rotating frame or mechanism, whose plane of rotation is normal to the landing strip, and wherein the GPS data is retransmitted from the interferometer to the aircraft.
Figure 5:
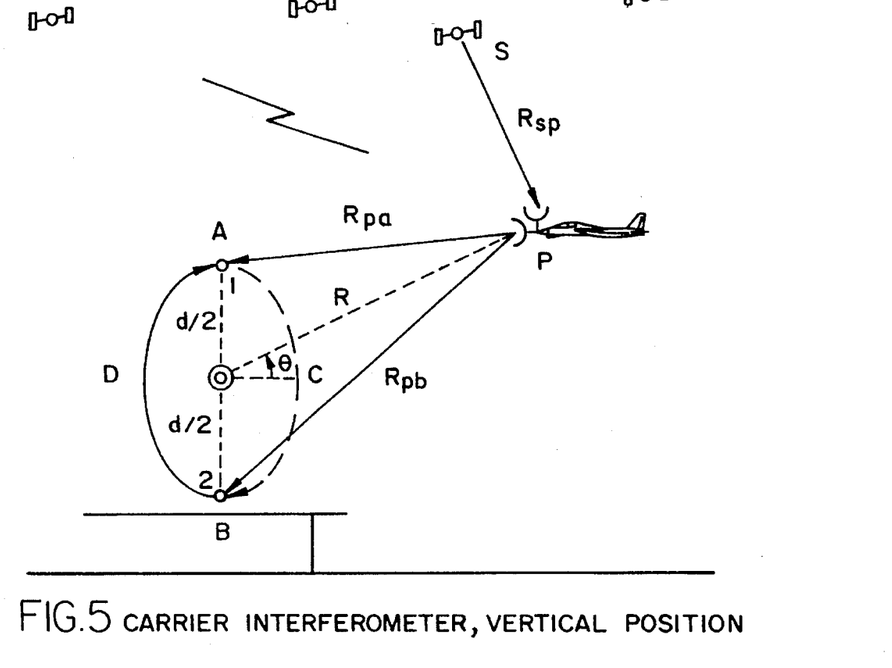
FIG. 5 illustrates a second embodiment of the subject invention wherein the carrier controls the aircraft landing, and the RTGPSI concept is reversed so that the retransmitting unit is located on the aircraft, allowing the carrier to compute the aircraft's position relative to the carrier deck, after which the carrier transmits automatic landing commands to the aircraft.

FIG. 4 illustrates a first embodiment pursuant to the present invention wherein an interferometer comprises two retransmitting units located at the landing site mounted on a rotating frame or mechanism, whose plane of rotation is normal to the landing strip, and wherein the GPS data is retransmitted from the interferometer to the aircraft. FIG. 5 illustrates a second embodiment of the subject invention wherein the carrier controls the aircraft landing, and the RTGPSI concept is reversed so that the retransmitting unit is located on the aircraft, allowing the carrier to compute the aircraft's position relative to the carrier deck, after which the carrier sends automatic landing commands to the aircraft.

The novelty of the approach of the present invention is in the integration of retransmission of the GPS signal, with an interferometer which comprises two retransmitting units located at the landing site and separated by a distance d. The two retransmitting units of the interferometer are mounted on a rotating mechanism, as shown in FIG. 4, whose plane of rotation is normal to the landing strip. Again, for the carrier the set-up is reversed as shown in FIG. 5.

The rotating mechanism allows for:

a determination of both the vertical and horizontal angular deviations with only two retransmitting units in the interferometer, each unit consisting of simply a GPS receiving and a transmitting antenna connected by an amplifier; and the virtually instantaneous resolution of the phase measurement ambiguities and the ability to instantaneously detect and correct for cycle slips.

Only one GPS satellite is required to determine the two angles, and the angular accuracy is not dependent on the relative position of the satellite (GDOP). There is a requirement however, for the landing point to be accurately surveyed.

Only two channels of the aircraft receiver are required to track the one satellite. Each channel is assigned to continuously track the single satellite signal through one of the retransmitting units of the interferometer.

Referring to FIG. 4, phase measurements are taken from each of the two receiver channels, when the two retransmitting units of the interferometer are in the AB and the BA positions to determine the vertical deviation angle; and from the same two channels for determining the horizontal angle, when the same two retransmitting units are in the CD and the DC positions. In retransmitting the GPS data, a simple mark must be added to the retransmitted GPS signal to allow the aircraft to determine which position the interferometer is in.

Figure 6:
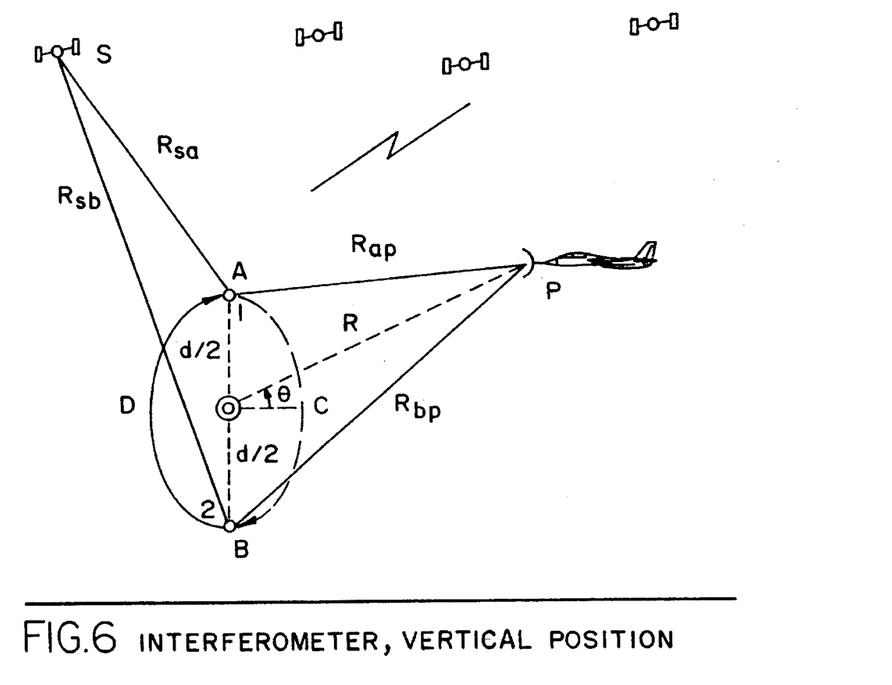
FIGS. 6 and 7 represent the basic geometries for determining respectively the vertical deviation angle θ and the horizontal deviation angle η.
Figure 7:
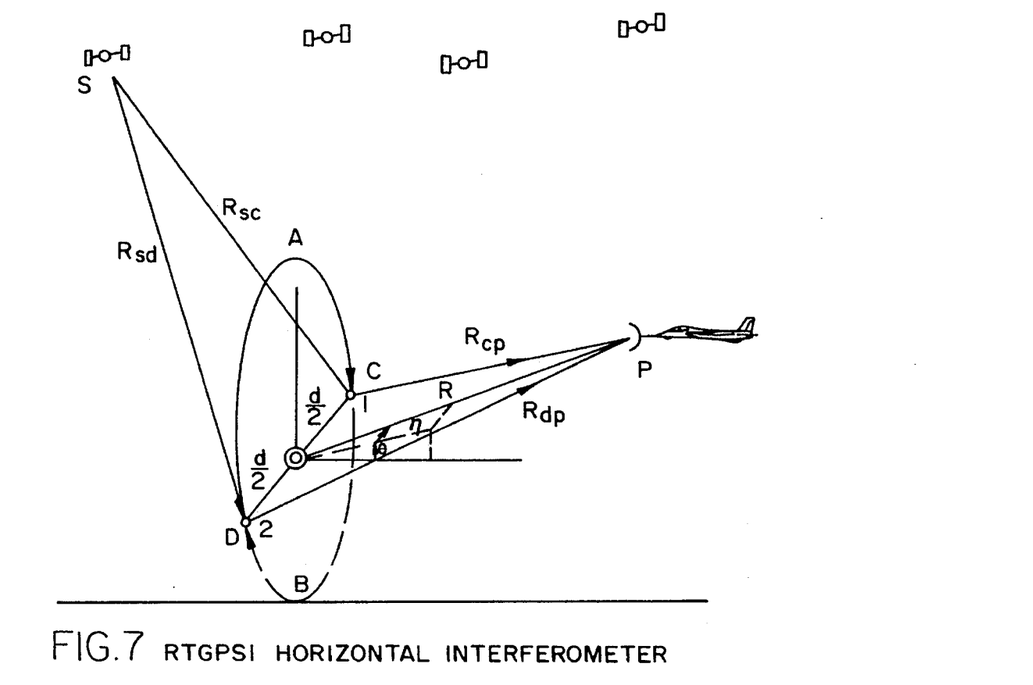

FIGS. 6 and 7 represent the basic geometry for determining the vertical deviation angle θ, and the horizontal deviation angle η, as well as the phase ambiguities and any cycle slips.

Figure 8:
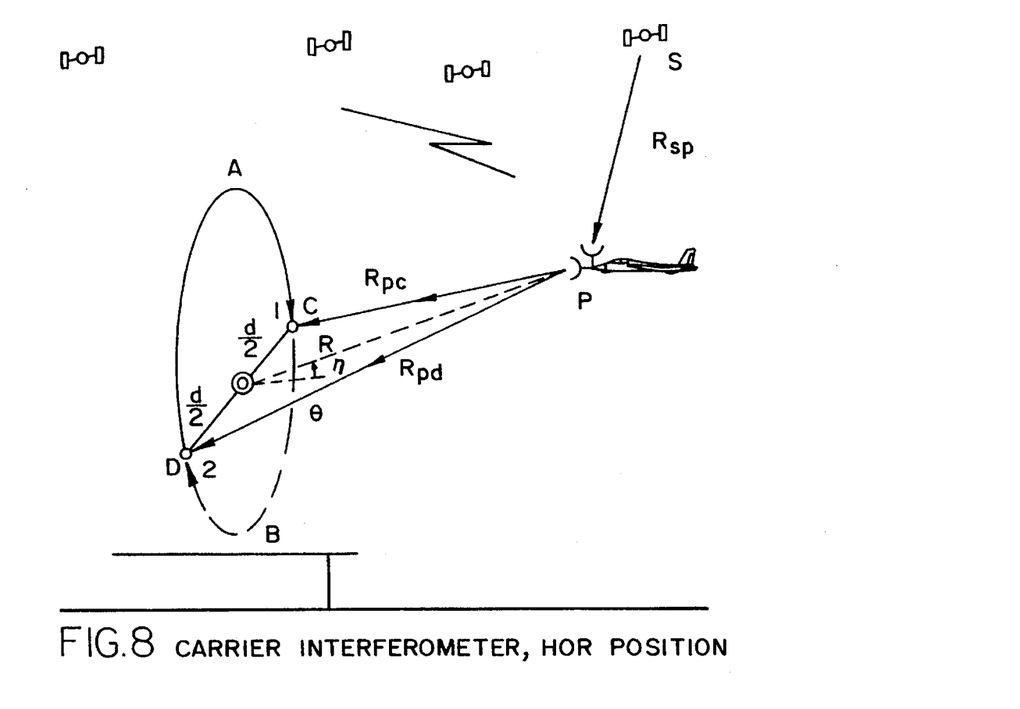
FIG. 8 illustrates an arrangement similar to that of FIG. 7 wherein the RTGPSI concept is applicable to a carrier landing, and the GPS data is retransmitted from the aircraft to a rotating interferometer on the carrier deck.

FIG. 8 illustrates an arrangement similar to that of FIG. 7 wherein the RTGPSI concept is applicable to a carrier landing; and the GPS data is retransmitted from the aircraft to the rotating interferometer on the carrier deck. Again, by reversing the situation, the RTGPSI concept is applicable to carrier landing, as illustrated in FIGS. 5 and 8. For the carrier, the process is reversed in that the retransmitting unit (only one) is on the aircraft and the rotating interferometer on the carrier is made up of two, receive only GPS antennas, and of course, no site survey is required. The algorithm is again quite simple and similar to the land based version. The same benefits accrue.

The derivation for the Vertical Deviation Angle follows; the horizontal deviation angle follows a similar procedure.

1. Land Based Version

Referring to FIG. 6, when antennas 1 and 2 are in the AB position, the cumulative GPS carrier phase measured by the two assigned GPS receiver channels is given by $$\Phi_{1a}^{i}=[R_{sa}^{i}+R_{ap}]/\lambda-N_{1}^{i} \quad (7)$$

$$\Phi_{2b}^{i}=[R_{sb}^{i}+Rb_{bp}]/\lambda-N_{2}^{i} \quad (8)$$

where:

$\Phi_{1a}^{i}$=phase measured by the receiver channel tracking satellite i via the retransmitted GPS path through antenna 1, when antenna 1 is in the A position. Similarly for $\Phi_{2b}^{i}$ $N_{1}^{i}$=initial accumulated phases ambiguity associated with the receiver channel locked to satellite i via the retransmitted GPS path through antenna 1, and similarly for $N_{2}^{i}$ When the antennas 1 and 2 have rotated to the BA positions respectively, assuming that the rotation of the antennas is rapid enough so that the satellite to interferometer geometry does not change during the swap, the same receiver channel provides the following cumulative GPS carrier phases, $$\Phi_{2a}^{i}=[R_{sa}^{i}+R_{ap}+\delta R_{ap}]/\lambda-N_{2}^{i} \quad (9)$$

$$\Phi_{1b}^{i}=[R_{sb}^{i}+R_{bp}+\delta R_{bp}]/\lambda-N_{1}^{i} \quad (10)$$

The pertinent phase differences are derived by taking the differences between eq 8 and 7, and 9 and 10, $$\Delta\Phi_{21a}^{i}=[R_{ab}^{i}-R_{sa}^{i}]/\lambda+[R_{bp}-R_{ap}]/\lambda+N^{i} \quad (5)$$

$$\Delta\Phi_{21b}^{i}=-[R_{sb}^{i}-R_{sa}^{i}]/\lambda-[R_{bp}-R_{ap}]/\lambda-[\delta R_{bp}-\delta R_{ap}]/\lambda+N^{i} \quad (6)$$

where the individual δR terms account for the motion of the aircraft relative to the specific interferometer antenna indicated by the subscripts, during the rotation of antennas 1 and 2 from the AB position to the BA position. Also, a new ambiguity term is defined which is the difference between the individual ambiguity terms.

Figure 9:
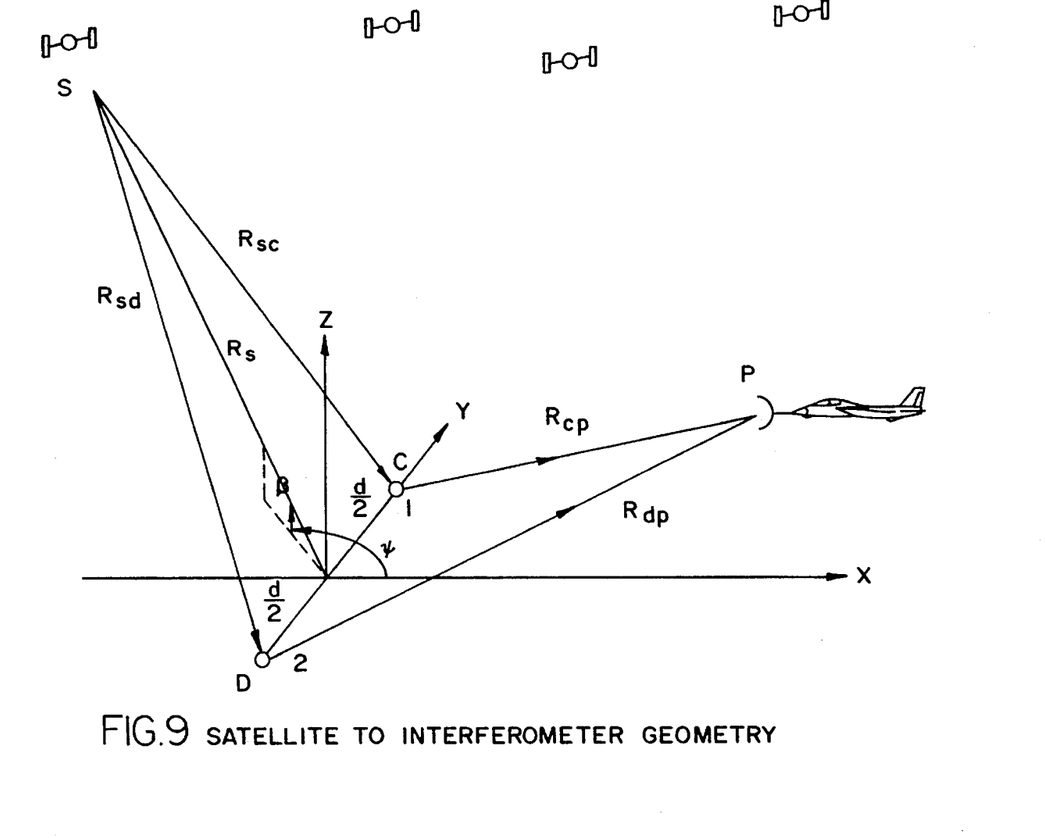
FIG. 9 illustrates the interferometer geometry wherein the GPS data is retransmitted from an interferometer at the landing strip to the aircraft.

At this point, some simplification can be achieved by invoking some very good approximations. Given the general interferometer assumption, d<<R, and the resulting small angle between the two aircraft to interferometer ranges, the differences between the δR terms which develop during the antenna swap are approximately zero, since the δR terms themselves are essentially equal. FIG. 9 illustrates the interferometer geometry wherein the GPS data in retransmitted from an interferometer at the landing point to the aircraft.

Also, the satellite to interferometer range difference, as defined by the first terms in each of the equations given above, as shown in FIG. 9, $$R_{sb}{}^i - R_{sa}{}^i = d \sin \beta^i$$

where $\beta^i$ is the elevation angle to satellite i.

Applying these conditions to equations (5) and (6) with some simplifying notation, yields, $$\Delta\Phi_{21a}{}^i = (d \sin \beta^i)/\lambda + \Delta R_{ba}/\lambda + N^i \tag{7}$$

$$\Delta\Phi_{21b}{}^i = -(d \sin \beta^i)/\lambda - \Delta R_{ba}/\lambda + N^i \tag{8}$$

Realizing that the first term on the right side of the equations is a known quantity, based on a site survey and the satellite position data provided by the GPS message, a new set of observables can be defined as;

$$\begin{cases} \nabla\Phi_{21a}^i = \Delta\Phi_{21a}^i - (d \sin \beta^i)/\lambda \\ \nabla\Phi_{21b}^i = \Delta\Phi_{21b}^i + (d \sin \beta^i)/\lambda \end{cases} \tag{9}$$

Substituting (9) into (7) and (8), and assembling into matrix form yields, $$\begin{bmatrix} \nabla\Phi_{21a}^i \\ \nabla\Phi_{21b}^i \end{bmatrix} = \begin{bmatrix} 1/\lambda & 1 \\ -1/\lambda & 1 \end{bmatrix} \begin{bmatrix} \Delta R_{ba} \\ N^i \end{bmatrix} \tag{10}$$

The solution to eq (10) requires a matrix inverse. The determinant of the matrix is equal to $2/\lambda$, which is never equal to zero and therefore the matrix will always have an inverse. The solution for the range differences and the ambiguities is then given by $$\begin{bmatrix} \Delta R_{ba} \\ N^i \end{bmatrix} = \begin{bmatrix} \lambda/2 & -\lambda/2 \\ 1/2 & 1/2 \end{bmatrix} \begin{bmatrix} \nabla\Phi_{21a}^i \\ \nabla\Phi_{21b}^i \end{bmatrix} \tag{11}$$

where it should be noted that the solution is not a function of the GDOP.

It can be shown, that the vertical deviation angle $\Theta$, is given by, $$\sin \Theta = \Delta R_{ba}/d \tag{12}$$

Therefore, a solution for $\Delta R_{ba}$ from (11) yields a solution for $\Theta$ from (12). Note that in the solution for the angle $\Theta$, it is not necessary to explicitly solve for the ambiguity.

The solution for the vertical deviation angle is now complete. On every half rotation of the interferometer, when the antennas 1 and 2 are in the AB or BA position, $\Delta R_{ba}$ is determined from (11). Using (12), the angle $\Theta$ is determined.

Note that the phase ambiguity is also available from equation (11), and is equal to the average of $\Delta\Phi_{21a}{}^i$ and $\Delta\Phi_{21a}{}^i$ (the terms involving $\sin \beta$ having canceled). It can be shown that a solution for this same phase ambiguity is also available from the horizontal solution and the two solutions form the basis for cycle slip detection.

Referring to FIG. 7, the horizontal deviation angle is derived when the interferometer antennas 1 and 2 are in the CD and DC positions. When they are in either of these positions, the phase measurements are taken from the same two receiver channels as are the phase measurements for the vertical deviation angles. This is an important feature of the approach as no additional hardware is necessary to derive the horizontal angle deviation. An additional benefit is that since the same channels are being used, and the same satellite is being continuously tracked, the phase ambiguities stay the same.

The following derivation for the horizontal deviation angle follows an approach essentially the same as that for the vertical deviation angle with similar assumptions which results in the following $$\begin{bmatrix} \Delta R_{cd} \\ N^i \end{bmatrix} = \begin{bmatrix} \lambda/2 & -\lambda/2 \\ 1/2 & 1/2 \end{bmatrix} \begin{bmatrix} \nabla\Phi_{21c}^i \\ \nabla\Phi_{21d}^i \end{bmatrix} \tag{13}$$

It can be shown that the horizontal deviation angle $\eta$, can be determined from $$\sin \eta = \Delta R_{cd}/d \tag{14}$$

The solution for the horizontal deviation angle is now complete. On every half rotation of the interferometer, when the antennas 1 and 2 are in the CD or DC position, $\Delta R_{cd}$ is determined from (13). Using (14) the horizontal deviation angle $\eta$ is defined. Note again, that the phase ambiguity need not be explicitly solved to derive $\eta$.

Also using (13), an independent solution for the same phase ambiguity as the vertical is obtained and should yield the same result. Note that on every quarter rotation of the interferometer, a solution for the phase ambiguity is available and a check for a change in value compared with the previous value yields an instantaneous detection of a cycle slip. Instantaneous correction can entail the use of the new value or substitution of another satellite, among other approaches.

2. Naval Carrier Version

For the carrier, as illustrated in FIG. 5, in keeping with the present criterion that the carrier controls the aircraft landing, the RTGPSI concept is reversed so that the retransmitting unit is located on the aircraft allowing the carrier to compute the aircraft's position relative to the carrier deck, after which the carrier sends automatic landing commands to the aircraft as is presently done.

This same approach can also be extended to land based landings if the airport tower has the characteristics of the aircraft to be controlled and a data link to provide commands to the aircraft autopilot. An additional advantage is that the same system can also be used to allow the tower to compute the position of the aircraft during marshaling for air traffic control, and during ground taxi for ground control.

Some of the enhanced features of this approach include:

a simple mechanization of two standard, receive only GPS antennas, which are rotated in a plane perpendicular to the carrier deck, and some additional channels in the carrier GPS receiver;

requires only a single retransmitting unit on the aircraft consisting of an amplifier connecting a receive and retransmitting GPS antenna;

uses very accurate GPS carrier phase measurements to derive interferometer horizontal and vertical deviation angles;

instantaneous resolution of the phase ambiguities;

instantaneous detection and correction of cycle slips;

only one GPS satellite is required for determining the horizontal and vertical interferometer deviation angles to the aircraft, whose accuracy is independent of the satellite to landing area geometry (GDOP, HDOP, VDOP);

elimination of the need for the carrier tracking radar and the need for any carrier transmission for determining aircraft position relative to the carrier deck.

Only a single satellite is required to mechanize the carrier GPS interferometer and to resolve the phase ambiguity using the antenna swap technique. Measurements are derived from the two receiver channels continuously tracking the same satellite, one via the retransmission of antenna 1, and the other via antenna 2. By taking phase measurements when the two antennas 1 and 2 are in the AB and the BA positions respectively, as shown in FIG. 5, allows for the determination of the vertical interferometer deviation angle 8. Taking measurements when the same antennas 1 and 2 are in the CD and the DC positions respectively, allows for the determination of the horizontal deviation angle η. This mechanization also allows for the two angles to be treated independently.

Referring to FIG. 5, the basic measurements for determining the vertical deviation angle are the two aircraft retransmitted GPS carrier accumulated phase measurements, corresponding to the two paths SPA and SPB. The aim is to determine the angle θ.

For a specific satellite, the following two retransmitted, accumulated phase measurements, measured when the antennas 1 and 2 are in the AB positions are given by, $$\Phi_{1a}{}^i = [R_{sp}{}^i = [R_{pa}]/\lambda - N_1{}^i \quad (15)$$

$$\Phi_{2b}{}^i = [R_{sp}{}^i = [R_{pb}]/\lambda - N_2{}^i \quad (16)$$

,where the notation is as follows:

$\Phi_{1a}{}^i$=phase measured by the receiver channel locked to satellite i via the retransmitted GPS path through the aircraft and received by antenna 1 when in the AB position, and similarly for the others $N_1{}^i$ =initial accumulated phase ambiguity associated with the receiver channel locked to satellite i via the retransmitted GPS path through the aircraft and received by antenna 1, and similarly for the others λ=GPS signal carrier wavelength When the antennas 1 and 2 have rotated to and are in the BA positions respectively, the same receiver channels provide the following GPS cumulative carrier phases to the same satellite i, $$\Phi_{1b}{}^i = [R_{sp}{}^i + \delta R_{sp}{}^i + R_{pb} + \delta R_{pb}]/\lambda - N_1{}^i \quad (17)$$

$$\Phi_{2a}{}^i = [R_{sp}{}^i + \delta R_{sp}{}^i + R_{pa} + \delta R_{pa}]/\lambda - N_2{}^i \quad (18)$$

,where the individual δR represent the relative motion between the aircraft and each of the interferometer antennas (including ship motion), and the relative motion between the aircraft and the satellite, which occurs during the rotation of the antennas from the AB positions to the BA positions.

The pertinent phase differences are derived by taking the differences between equation (16) and (15), and between (18) and (17), which results in the cancellation of the satellite to aircraft ranges and their common errors, yielding, $$\Phi^i_{1a2b} = \Phi^i_{1a} - \Phi^i_{2b} \quad (19)$$

$$= [R_{pb} - R_{pa}]/\lambda + N^i_{21}$$

$$\Phi^i_{1b2a} = \Phi^i_{1b} - \Phi^i_{2a} \quad (20)$$

$$= -[R_{pb} - R_{pa}]/\lambda - [\delta R_{pb} - \delta R_{pa}]/\lambda + N^i_{21}$$

where: $N_{21}{}^i = N_2{}^i - N_1{}^i$ Simplifying the notation, (19) and (20) become $$\Delta\Phi_{1a2b}{}^i = \Delta R_{bpa}/\lambda + N_{21}{}^i \quad (21)$$

$$\Delta\Phi_{1b2a}{}^i = -\Delta R_{pba}/\lambda - \delta R_{pba}/\lambda + N_{21}{}^i \quad (22)$$

At this point some simplification can be achieved by invoking some very good approximations. Given the usual interferometer assumption d<<R, results in a very small angle between $R_{pa}$ and $R_{pb}$. While the individual δR in (20) will change significantly during the antenna swap, their difference, given the above assumptions, will not since the angle between them remains small. Therefore, we can assume $\delta R_{pba}$ is zero in (22). Assembling into matrix form $$\begin{bmatrix} \Delta\Phi^i_{1a2b} \\ \Delta\Phi^i_{1b2a} \end{bmatrix} = \begin{bmatrix} 1/\lambda & 1 \\ -1/\lambda & 1 \end{bmatrix} \begin{bmatrix} \Delta R_{pba} \\ N^i_{21} \end{bmatrix} \quad (23)$$

It can be seen that a solution exists, and hence the range difference and ambiguity immediately solvable, if the 2×2 coefficient matrix has an inverse. This matrix is invertible if its determinant ≠0. Its determinant is given by $$Det=2/\lambda$$

and therefore the matrix is always invertible, and not a function of the geometry. The solution to equation (23) is then $$\begin{bmatrix} \Delta R_{pba} \\ N^i_{21} \end{bmatrix} = \begin{bmatrix} \lambda/2 & -\lambda/2 \\ 1/2 & 1/2 \end{bmatrix} \begin{bmatrix} \Delta\Phi^i_{1a2b} \\ \Delta\Phi^i_{1b2a} \end{bmatrix} \quad (24)$$

Therefore, the phase ambiguity is simply the average of the two phase observables to a single satellite which is given by $$N_{21}{}^i = 0.5 \ (\Delta\Phi_{1a2b}{}^i + \Delta\Phi_{1b2a}{}^i) \quad (25)$$

Note that the determination of the ambiguity is not dependent upon a change in the satellite geometry, and that the ambiguity is determined virtually instantaneously after a single swap of the antennas, and thereafter on every interchange.

It will also be noted that equation (24) also yields the term $\Delta R_{pba}$, which is the term of interest in defining the interferometer angle. It is given by $$\Delta R_{pba} = 0.5 \ \lambda \ [\Delta\Phi_{1a2b}{}^i - \Delta\Phi_{1b2a}{}^i] \quad (26)$$

The equation for deriving the vertical deviation angle Φ is given by, $$\Delta R_{pba} = d \ \sin\Phi \quad (27)$$

or solving for the angle, $$\Phi = \sin^{-1}(\Delta R_{pba}/d) \quad (28)$$

In a similar approach, the horizontal angle can be determined. Again, referring to FIG. 5, the basic measurements for determining the horizontal deviation angle are the two aircraft retransmitted GPS carrier accumulated phase measurements, corresponding to the two paths SPC and SPD. The aim is to determine the angle $\eta$.

In this case, the antennas 1 and 2 are rotated to the CD positions while the same receiver channels used to determine the vertical remain locked to the same satellite, and are now used to determine the horizontal deviation angles.

It is important to note that data is taken from the same two receiver channels which remain locked to the same satellite as the interferometer antennas 1 and 2 rotate from the AB to CD to BA and DC positions. Data for the vertical determination is taken when the antennas are in the AB and BA positions and for the horizontal when in the CD and DC positions.

Following a derivation similar to that for the vertical, the following results, $$\begin{bmatrix} \Delta R_{pdc} \\ N_{21}^i \end{bmatrix} = \begin{bmatrix} \lambda/2 & -\lambda/2 \\ \lambda/2 & 1/2 \end{bmatrix} \begin{bmatrix} \Delta \Phi_{1c2d}^i \\ \Phi_{1d2c}^i \end{bmatrix} \quad (29)$$

Therefore, the same phase ambiguity as that for the vertical can also be derived from the horizontal data, and is simply the average of the two horizontal phase observables which is given by $$N_{21}^i = 0.5 \ (\Delta \Phi_{1c2d}^i + \Delta \Phi_{1d2c}^i) \quad (30)$$

Note again that the determination of the ambiguity is not dependent on a change in the satellite geometry. It should also be noted that after the first complete rotation of the antennas though the four positions, the ambiguity can be derived at each of the four antenna positions, or four times with each complete rotation of the antennas.

Equation (29) also yields the term $\Delta R_{pdc}$ which is the term of interest in defining the horizontal interferometer deviation angle. It is given by $$\Delta R_{pdc} = 0.5 \ \lambda \ [\Delta \Phi_{1c2d}^i - \Delta \Phi_{1d2c}^i] \quad (31)$$

which can be shown to be related to the angle $\eta$ by, $$\Delta R_{pdc} = d \sin \eta \quad (32)$$

or $$\eta = \sin^{-1}(\Delta R_{pdc}/d)$$

In this case, a measurement of the angle $\eta$ is available twice with each full rotation of the interferometer. However, it should be realized that a measurement of the angles $\theta$ and $\eta$ are not available simultaneously, but rather are individually available on alternate quarter rotations of the interferometer antennas. This must be accounted for in the aircraft landing dynamics controlling the auto-landing.

3. RTGPS/RTGPSI

The combined system is basically integrated by software, and the two systems utilize the same hardware. RTGPS is able to determine the relative position of the aircraft to the center of the rotating interferometer antennas by knowing the position of the interferometer at measurement time (AB,BA, CD,DC). This provides the relative position from which the range can be determined. Note that the range is not determined from the measurements where the range and the attendant retransmission errors have been canceled. The RTGPSI system provides the angular deviations of the aircraft from the proscribed landing flight path and can be fed into the aircraft autopilot. Loop gains can be controlled based on the range.

C. Signal Overlap

In the above, signal interference, or overlap, has been neglected. In the practical world it cannot be neglected since the reception of both the direct and retransmitted GPS transmissions is an overlap condition. The following provides a solution to the overlap problem which will not alter the results of the above where overlap was neglected.

1. RTGPS

The retransmission of the GPS signals will cause an overlap with the direct GPS signals at unit 2. A solution to this problem is to shift the GPS signal at retransmission to another L band carrier which is accomplished by including some low cost heterodyne electronics in the retransmission amplifier. At unit 2, where the retransmitted GPS signal is received, low cost heterodyne electronics are again used to shift the signal back to GPS L band so that the standard GPS receiver could be used. Any errors introduced by heterodyne will similarly affect each of the retransmitted satellite data the same and fall out of the double difference equations along with all the other retransmission induced errors, in the same way that the range between the two units falls out.

If it is preferable not to shift the retransmitted GPS signal back to the standard GPS frequency upon reception of the retransmitted GPS signal, then the appropriate receiver can be used and the equations given above altered slightly to include the retransmitted frequency $\lambda_r$ in lieu of the GPS frequency A in the retransmitted variables.

2. RTGPSI

In the land based civil airport case, the interferometer is made up of two retransmitting units, which are essentially a GPS receive and a transmit antenna connected by an amplifier. Since the aircraft receives both the direct and each of the retransmitted GPS signals, the overlap of the signals can be a problem. A simple, low cost, method proposed to prevent overlap at the aircraft, is by having the ground based retransmitting unit, heterodyne the GPS signal to some other convenient carrier frequency, as indicated above. For the interferometer, this means that each retransmitting unit of the interferometer has to switch the GPS signal to another, not the same, carrier frequency.

In the operational GPS system, each GPS satellite transmits its data on the same carrier frequency but prevents overlap by using a pseudo-random code different from all the other satellites, which also serves as an ID for the satellite. The GPS receiver provides a code based pseudorange measurement, and also generates accumulated carrier phase measurements by taking the difference between the phase of the GPS carrier signal of the satellite measured at the receiver, relative to the phase of the same carrier frequency generated by a clock within the receiver. The receiver provides an accumulating phase over preset epochs. The phase ambiguity is the unknown integer number of cycles which exists at the initial epoch.

The phase observable for determining the interferometer angles is determined from the difference between the accumulated carrier phase measurements made at the aircraft, based on the GPS signal received from each of the interferometer retransmitting units. This is the overlap situation.

In this light, if each of the GPS signals passed by the interferometer retransmitting units, were shifted to different carrier frequencies, an accumulated phase measurement could still be generated for each frequency shifted signal, relative to its own frequency generated within the receiver, by the same clock. Then in deriving the phase difference observable by formulating the difference between the accumulated phase measurements, one need only account for the difference in the wavelengths and the result is essentially the same as when overlap is neglected.

D. Cycle Slips

An important consideration when utilizing carrier phase measurements, is the occurrence of cycle slips. The problem arises due to the undetected loss or introduction of an integral number of cycles to the cumulative count thereby showing up as a change in the value of the phase ambiguity. In general, cycle slips occur due to weak or temporary loss of signal leading to difficulty, on the part of the receiver, in tracking the carrier. Cycle slips can range from several cycles in weak signal conditions, to several thousands when momentary loss of lock occurs.

By using the RTGPSI concept with the antenna swap, cycle slips can be easily detected and corrective action taken virtually instantaneously. This also applies to the RTGPS concept as well. RTGPS requires at least 4 satellites for a navigational solution and in general is based on 4 code based pseudo-range measurements. However, significantly improved accuracy can be obtained by used the cumulative phase measurements but resolving the phase ambiguities is a slow process. Once solved, detecting cycle slips cannot be done instantaneously. RTGPSI can assist, as if a cycle slip is detected for RTGPSI, then it is safe to assume that it has also affected the RTGPS measurements as well.

Recalling that the antenna swap is performed on a continuous basis and that the phase ambiguity is determined from equation (11) when the interferometer is in the vertical position, and from equation (21) when the interferometer is in the horizontal position, the algorithm can be implemented such that the phase ambiguity is determined on every measurement, after the first two. The phase ambiguity should remain constant except when a cycle slip occurs. When one does occur, the phase ambiguity will change exactly in accordance with the number of cycle slips. Monitoring the phase ambiguity estimates for such a change, on a measurement to measurement basis, allows for immediate detection of a cycle slip. For this reason it would be prudent to apply the RTGPSI solution to all satellites in view so that if a cycle slip occurs several correction alternatives are available.

When a cycle slip is detected, the immediate course of action can take several forms. Since the RTGPSI concept requires only one satellite to determine the RTGPSI angles, and 4 or more satellites can be monitored for redundancy, the offending satellite can be dropped from the calculation for as long as necessary. Since the algorithm is not a function of the GDOP, any satellite in view can be used, not only those which satisfy a GDOP constraint. Another alternative, especially in the case of small cycle slips, is just to use the newly estimated value of the phase ambiguity. Truth checks using redundant satellites, or from a measurement of range rate, can confirm this approach. In either case, the approach offers a very flexible and immediate solution to the problem of cycle slips.

E. RTGPSI Special Issues

There are several issues which must be addressed for the RTGPSI mechanization. They include a site survey for the land based version, and tagging the interferometer positions, AB,BA, CD, and DC.

1. Site Survey

The algorithms presented above for the land based version of RTGPSI depend upon a knowledge of the interferometer position. The naval carrier version does not. A site survey is easy enough to perform to the required accuracy. The question however, is how these site parameters are conveyed to the aircraft, given that the aircraft could be landing at any instrumented airport or locale. Several options are open:

the parameters could be provided by voice from the control tower and entered by the pilot;

the parameters could be published and the pilot could enter the values from the published chart;

the aircraft computer could contain a preprogrammed data base;

the preferred method is to include the data in the GPS navigation message. The GPS navigational message structure has provisions for special messages and in addition has some spare words in several data blocks. The site survey data could be inserted during the retransmission process in an agreed upon block in the message.

2. Rotating Interferometer

In RTGPSI, the interferometer consists of two retransmitting units, essentially one mounted on either end of a rotating frame. Mechanically, this should not be a challenging problem. A retransmitting unit will consist of a hemispherical GPS receive and a transmit antenna connected by a heterodyne amplifier. The whole unit should not be more than several pounds which can easily be accommodated by a rotating mechanism whose rotation rate should be fairly slow. Further, these are very mature and reliable components.

Indexing of the antennas to the four cardinal positions can also be easily accomplished by an accurately located magnetic pickup which is then used to tag the retransmitted GPS signal.

F. Integrity Issues

Within the landing scenario, the issue of integrity is critical. There are two aspects to the integrity issue, the rapidity with which a failure or degradation is identified, and the rapidity with which corrective action is taken.

Within this category, one must include ambiguity resolution and cycle slips for the intent is to utilize the more accurate GPS carrier accumulated phase measurement over the code based pseudo-range measurement wherever possible.

Both of these issues are intimately dependent upon the redundancy built into the system. In general, redundancy means higher costs. However, in the RTGPS/RTGPSI system an enormous amount of redundancy is inherent in the system and does not require any additional cost.

It should be realized that we are dealing with two navigation systems deriving data from the GPS satellites in different ways. One derives relative position and velocity from data received directly from the satellites and also from the same satellites via retransmission (RTGPS). The second derives the angular deviations of the aircraft from the landing strip reference based upon the data from one satellite retransmitted through the interferometer (RTGPSI). The accuracy of the first is GDOP dependent, the second is not.

The following points address integrity issues.

Redundancy - The RTGPS requires four satellites to derive a solution, receiving data from the four satellites via a direct route and also via the retransmission route. The RTGPSI requires receiving data from only one satellite, via the retransmission through the interferometer to derive the angular deviations. Therefore, for each solution of RTGPS, four individual RTGPSI solutions, using the same satellites, are available as a check of the RTGPS solutions on a measurement to measurement basis. These solutions are also available for averaging for further error reduction. This provides a virtually instantaneous check for a "hard or soft" failure. Further, having identified a failure allows for instantaneous reassortment to a backup solution.

Phase ambiguity and cycle slips - It has been shown previously that the phase ambiguity associated with RTGPSI is resolved virtually instantaneously, and as such provides for instantaneous cycle slip monitoring and corrective action as well. While the phase ambiguity being resolved is that associated with RTGPSI, it is also associated with the retransmission and not with the direct reception part associated with RTGPS. However, the same satellites are being tracked in the same receiver (albeit by different channels) so that the same cycle slip detection of RTGPS can also be a good indicator of cycle slip in RTGPS.

Coverage - In the event of a GPS satellite failure in the standard GPS approach, coverage may be lost in a wide geographical area and simply directing the aircraft to another airport in the vicinity may not be sufficient since the failed satellite may affect the other airport in the same way. With RTGPS/RTGPSI however, a failed satellite is not a problem since the RTGPSI part requires only one satellite and is not affected by GDOP.

A full complement of data is available by the system over a full hemisphere.

While several embodiments and variations of the present invention for a retransmitted GPS interferometric system are described in detail herein, it should be apparent that the disclosure and teachings of the present invention will suggest many alternative designs to those skilled in the art.

What is claimed is:

1. A retransmitted Ground Positioning System (GPS) using retransmission of a GPS signal, in combination with an interferometer for determining the angular deviations of an aircraft relative to a landing site in both vertical and horizontal planes, using the accumulated phase of the GPS carrier signal, comprising:

a. an aircraft and a landing site, wherein a first unit comprising one of the aircraft and the landing site includes a GPS retransmitter for retransmitting GPS signals to a second unit comprising the other of the aircraft and the landing site, which includes a GPS receiver/computer;

b. the landing site includes an interferometer comprising two spaced apart GPS antennas mounted on a rotating frame, the plane of rotation of which. is normal to the landing strip.

2. A retransmitted ground positioning system interferometer as claimed in claim 1, wherein each GPS antenna in the interferometer comprises a GPS receiving antenna and a GPS transmitting antenna, and an amplifier connecting the GPS receiving antenna with the GPS transmitting antenna, and the aircraft includes a GPS receiving antenna and a GPS receiver/computer.

3. A retransmitted ground positioning system interferometer as claimed in claim 2, wherein the GPS receiver/computer includes two channels, each of which continuously tracks a single satellite GPS signal through one of the GPS antennas of the interferometer.

4. A retransmitted ground positioning system interferometer as claimed in claim 1, wherein the landing site comprises an aircraft carrier, wherein the aircraft carrier includes two receive only GPS antennas, which are rotated in a plane perpendicular to the carrier deck, and a GPS receiver/computer; and a single GPS retransmitting unit is mounted on the aircraft and comprises a GPS receiving antenna, a GPS transmitting antenna, and an amplifier connecting the GPS receiving antenna with the GPS transmitting antenna.

5. A retransmitted ground positioning system interferometer as claimed in claim 4, wherein the GPS receiver/computer includes two channels, each of which continuously tracks a single satellite GPS signal through one of the GPS antennas of the interferometer.

6. A retransmitted ground positioning system interferometer as claimed in claim 1, wherein phase measurements are taken from each of the two GPS antennas of the interferometer when the two GPS antennas are in a first vertical position and a second reversed vertical position to determine the vertical deviation angle, and from each of the two GPS antennas for determining the horizontal angle when the two GPS antennas are in a first horizontal position and a second reversed horizontal position.

7. A retransmitted ground positioning system interferometer as claimed in claim 6, wherein in retransmitting the GPS data, a positional mark is added to the retransmitted GPS signal to enable the aircraft to determine the angular position of the interferometer.

8. A retransmitted ground positioning system interferometer as claimed in claim 7, wherein indexing of the antennas to the four positions is accomplished by a pickup which detects the angular position of the interferometer.

9. A retransmitted ground positioning system interferometer as claimed in claim 1, wherein the retransmitted data received at the second unit from the first unit is processed by a GPS receiver/computer in the second unit, and the second unit determines a pseudo-range and a pseudo-range rate measurement, from which it computes the first unit's position and velocity based upon the retransmitted GPS data and its own position and velocity based upon GPS data it receives directly.

10. A retransmitted ground positioning system interferometer as claimed in claim 1, wherein when the landing site comprises a landing field, the interferometer position site parameters in the landing field are conveyed to the aircraft by including the data in the GPS navigational message transmitted to the aircraft.

11. A retransmitted ground positioning system interferometer as claimed in claim 1, wherein the GPS receiver/computer provides a code based pseudo-range measurement, and also generates accumulated carrier phase measurements by taking the difference between the phase of the GPS carrier signal of the satellite measured at the receiver, relative to the phase of the same carrier frequency generated by a clock within the receiver, and the receiver/computer provides an accumulated phase measurement.

12. A retransmitted ground positioning system interferometer as claimed in claim 11, wherein the GPS receiver/computer derives relative position and velocity from data received directly from the satellites and also from the same satellites via retransmission.

13. A retransmitted ground positioning system interferometer as claimed in claim 1, wherein each of the retransmitted GPS signals is shifted to a different carrier frequency, and an accumulated phase measurement is generated for each frequency shifted signal, relative to a frequency signal generated within the receiver by a clock.

* * * * *